United States Patent Office 3,814,610
Patented June 4, 1974

---

3,814,610
POLYMERIC COMPOSITIONS CONTAINING BIS(2,3-DIHALOPROPYL) 2 - CYANO-ALKYLPHOSPHONATES AS FLAME RETARDANTS
Arthur D. F. Toy, Stamford, Conn., and Kenneth I. Eilers, Irvington, N.Y., assignors to Stauffer Chemical Company, Westport, Conn.
No Drawing. Original application Sept. 21, 1970, Ser. No. 74,139, now Patent No. 3,745,197. Divided and this application Feb. 23, 1973, Ser. No. 335,406
Int. Cl. C09d 5/18, 3/40
U.S. Cl. 106—16                                              6 Claims

---

ABSTRACT OF THE DISCLOSURE

The new compounds bis(2,3-dihalopropyl) 2 - cyano-alkylphosphonates are disclosed which have been found to be effective flame retardants for plastics such as polymethyl methacrylate, cellulose acetate, and viscose rayon.

---

This is a division of application Ser. No. 074,139, filed Sept. 21, 1970, and now U.S. Pat. No. 3,745,197.

The present invention relates to new fire retardant compounds which can be effectively used as fire retardant agents in all polymer systems and especially in cellulosic materials such as rayon and cellulose acetate and acrylic polymers such as polymethyl methacrylate.

BACKGROUND OF THE INVENTION

Brominated diallyl and triallyl phosphates are well known in the prior art as evidenced by U.S. Pat. 2,574,515. Cyanoethyl phosphonate compounds are also well known as evidenced by Pat. 2,844,558. The O,O'-di-n-propyl 2-cyanoethylphosphonates are also known as evidenced by Pat. 2,754,320. Of these compounds, the brominated triallyl phosphate compound appears to be the most effective. These compounds require an extremely large quantity of chemically combined bromine to be effective as flame retardants.

It has now been found that a flame retardant compound can be prepared with a lesser amount of bromine which is as effective as brominated triallyl phosphate and which compound shows an effective utility in flame retarding various polymer compositions, particularly the modified cellulose compositions and polymethyl methacrylate.

THE INVENTION

In accordance with the present invention, there are provided the new fire retardant agents (2,3-dihalopropyl) 2-cyanoalkylphosphonates which can be represented by the formula:

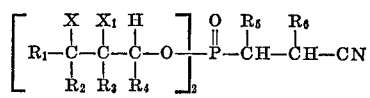

wherein $R_1$ and $R_2$ independently represent hydrogen, $C_1$–$C_4$ alkyl and $C_1$–$C_4$ haloalkyl radicals (halo being derived from chlorine or bromine); $R_3$, $R_4$, $R_5$, and $R_6$ independently represent hydrogen and $C_1$–$C_4$ alkyl radicals; and $X$ and $X_1$ are halogen radicals derived from chlorine or bromine; and the mixed alkyl and/or mixed halogen derivatives thereof. $R_1$–$R_6$ are preferably hydrogen and the halogen radical is preferably derived from bromine. These compounds at their specific level of bromine have been found to be as effective in flame retarding as other known compounds containing higher levels of bromine. Polymer systems including processed polymers which can take advantage of the flame retardant characteristics of these compounds include polyurethanes, cellulosics and modified cellulosics, polyamides, polyhalides, polyolefins, polyesters, acrylics, polyethers, polyacetals, epoxys, phenolics, polyphenylene oxide, and rubber.

The compounds of the present invention are bis(2,3-dihaloalkyl) 2 - cyanoalkylphosphonates. The dihaloalkyl groups are based on a normal propyl group, e.g., a carbon chain of 3, and which have halogens of either chlorine or bromine attached to both the 2 and 3 position of the propyl group. Mixed halogen derivatives such as 2-chloro, 3-bromo, are also included within the scope of the invention. In addition to hydrogen, the propyl group can also be substituted with other non-interfering organic groups. The terminal or number 3 carbon can be substituted with one or more lower alkyl radicals having from 1 to 4 carbons illustrated by methyl, ethyl, propyl, isopropyl, butyl and isobutyl as well as with the corresponding halogen derivatives (chlorine and bromine). The haloalkyls can be illustrated by chloromethyl, chloroethyl, chloropropyl, chlorobutyl, and the corresponding bromine derivatives. The alpha and beta carbons can be substituted with a $C_1$–$C_4$ lower alkyl radical such as those given hereinbefore.

The cyano group is attached to the phosphorus atom by a 2 carbon atom chain. Two of, and preferably all of, the remaining valences of the carbon chain are hydrogen. One valence on each carbon can be substituted with a $C_1$–$C_4$ lower alkyl radical.

Preferably, all the replaceable groups on both the ester and the cyano portion of the phosphonate are hydrogen. The halogen is preferably bromine.

The compounds of the present invention can be easily prepared by halogenating (chlorinating or brominating) diallyl-2-cyanoethylphosphonate and derivatives thereof. These compounds are well known in the prior art. The method for halogenating allylphosphates are also well known in the prior art and can be illustrated by those set forth in U.S. Pat. 2,574,515. This method of preparing the compounds of the invention is given as illustrative and applicants do not intend the invention to be limited thereby.

Illustrative of compounds within the scope of the present invention are:

(1) bis(2,3-dichloropropyl) 2-cyanoethylphosphonate
(2) bis(2,3-dibromopropyl) 2-cyanoethylphosphonate
(3) [(2,3-dichloropropyl)(2,3-dibromopropyl)] 2-cyanoethylphosphonate
(4) bis(2-chloro-3-bromo-propyl) 2-cyanoethylphosphonate
(5) bis(2,3-dibromopropyl) 1-methyl-2-cyanoethylphosphonate
(6) bis(2,3-dibromopropyl) 2-methyl-2-cyanoethylphosphonate
(7) bis(2,3-dibromobutyl) 2-cyanoethylphosphonate
(8) bis(2,3-dibromopentyl) 2-cyanoethylphosphonate
(9) bis(2,3,6-tribromohexyl) 2-cyanoethylphosphonate
(10) bis[2-(3,4-dibromobutyl)] 2-cyanoethylphosphonate
(11) bis(2-methyl-2,3-dibromopropyl) 2-cyanoethylphosphonate These are given only as illustrative and it is not intended that the invention be limited thereto.

Compounds of the present invention are effective flame retardants for various polymer systems which include polyurethanes, either expanded or foamed and/or in flexible or rigid forms; the cellulosic which include wood pulp, paper, fibre board and wood fibre as well as cotton and wool; modified celluloses such as cellulose acetate and rayon; olefin polymers such as polyethylene or polypropylene; natural and synthetic rubbers such as SBR (styrene-butadiene-rubber); epoxy polymers; polyesters; polyacrylates and their esters, amides and nitriles; polyvinyl acetals such as polyvinyl butryal; phenolics, polyethers such as polyethylene glycol; vinyl polymers such as polyvinyl chloride and the like. Extensive discussions of these polymers are well known in the prior art and can be more fully found in various texts such as Polymers and Resins, Golding, D. Van Nostrand (1959) as well as Kirk-Othmer, Encyclopendia of Chemical Technology, 2nd Edition, by Inter-Science.

Of particular importance, it has been found that the modified celluloses such as cellulose acetate and viscose rayon can be effectively flame retarded by the use of the compounds of the present invention. The compositions of the present invention can be applied directly to fabrics by padding, dipping, or spraying solutions or other such means in order to effectively provide an added on weight of from 2.5 to 25%, by weight. It is preferred that the treated material contain at least 5% and preferably from 10 to 20% of the stated additive in order to provide effective flame retarding results.

The compounds of the present invention can also be utilized by admixing with a polymer composition prior to the formation of the polymer into its various forms such as fibres, films and the like. It is preferred for effective flame retardancy to load the polymer compositions with from 2.5 to 25%, by weight, of the flame retardant additive. Other materials such as plasticizers and the like can also be present for effective processing of the polymers. Other ingredients such as fillers, dyes, pigments, stabilizers and the like can also be present in the polymer without adversely affecting the flame retardancy.

This invention will be more fully illustrated in the examples which follow.

EXAMPLE 1

Preparation of bis(2,3-dibromopropyl) 2-cyanoethylphosphonate $$(CH_2BrCHBrCH_2O)_2-\overset{O}{\underset{\uparrow}{P}}-CH_2CH_2CN$$

Bis(2,3-dibromopropyl) 2-cyanoethylphosphonate was prepared by placing 80 grams (0.37 mole) of diallyl 2-cyanoethylphosphonate and 300 milliliters of methylene chloride in a one liter round bottom, reaction flask equipped with a mechanical stirrer, thermometer and a nitrogen purge and a solid carbon dioxide-acetone cooling bath. The flask was also equipped with an addition funnel containing about 118 grams (0.38 mole) of bromine and 200 milliliters of methylene chloride. The bromide solution was added slowly to the phosphonate over a two hour period while maintaining the temperature of the reaction mass at below $-40°$ C. Upon completion of the addition the reaction mass was allowed to warm to room temperature. Excess bromine was removed by washing the reaction mass with 200 milliliters of saturated sodium thiosulfate solution. The acidity of the reaction mass was removed by washing with 200 milliliters of saturated sodium carbonate solution. After layer separation the product layer was washed with 100 milliliters of water. The product layer slowly separated and the solvent was removed from the yellow-green product by evaporation in a rotary evaporation flask, the vacuum being applied for 48 hours. The structure was confirmed by elemental, infrared and nuclear magnetic resonance analytical techniques.

EXAMPLE 2

Preparation of bis(2,3-dichloropropyl) 2-cyanoethylphosphonate

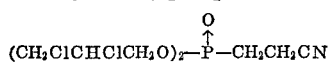

In a 2-liter round bottom flask equipped with a mechanical stirrer and thermometer, and under which was positioned a solid carbon dioxide/acetone cooling bath, was placed 124 grams (0.57 mole) of diallyl 2-cyanoethylphosphonate in 1 liter of methylene chloride and the mixture was cooled to below $-10°$ C. Excess chlorine (at least 81 grams corresponding to 0.57 mole chlorine per allyl group) was slowly admitted while maintaining the temperature below $-10°$ C. After the addition was complete, the reaction mixture was allowed to stand for five minutes with the excess chlorine which was then purged with nitrogen. The reaction mixture was then allowed to warm to room temperature. The reaction mixture was washed with a saturated sodium thiosulfate solution and the acidity removed by washing with a saturated sodium bicarbonate solution. As methylene chloride tends to form an emulsion, the reaction mixture was washed with a sodium chloride solution to break the emulsion. The methylene chloride layer was separated by adding anhydrous dried magnesium sulfate powder thereto. The methylene chloride layer was then filtered and the solvent stripped in using a rotary vacuum solvent evaporator. The structure of the product was confirmed by infrared spectral analysis.

Other compounds within the scope of the invention can be easily provided by varying the phosphonate reactants in the foregoing procedure.

EXAMPLE 3

The flame retardant compounds of the present invention are utilized and tested as follows:

Cellulose acetate.—The flame retardant compounds of Examples 1 and 2 are mixed in a 20 weight percent solution of cellulose acetate in an 80/20 acetone/methanol solvent system. The solution is then cast into a 15-mil sheet and air dried for 1 hour followed by an oven drying at 70–80° C. for about 1 hour. The fire retardant is used in such an amount that the final dry film contains a given percentage of fire retardant based on the dry weight of the acetate. Strips are then cut from the film for testing.

Viscose rayon.—Weighed samples of fire retardant of Examples 1 and 2 are dissolved in a solvent such as dichloromethane and known weights of viscose rayon staples are alternately dipped into the solution and air dried until all the solution is consumed. The treated staples are then air dried over night, manually carded for homogeneity and tested for flame retardancy.

The samples of cellulose acetate and viscose rayon as prepared above are tested for flame retardancy by igniting the same in a bunsen burner flame. The ratings are objective and run from Group A (poor) to D (best). Borderline results are given mixed ratings which overlap two Groups.

TABLE I

| | Polymer substrate | | | | | |
|---|---|---|---|---|---|---|
| | Cellulose acetate | | | Viscose rayon (5 grams) | | |
| Fire retardant | 2.5% | 5.0% | 10% | 0.15 g. | 0.3 g. | 0.6 g. |
| Product of Example 1 $(CH_2BrCHBrCH_2O)_2P(O)CH_2CH_2CN$ | C-D | D | | | C-D | D |
| Product of Example 2 $(CH_2ClCHClCH_2O)_2P(O)CH_2CH_2CN$ | B | C | C-D | B | B-C | B-C |

NOTES:
A=Flammable.
B=Partially flammable.
C=Partially self-extinguishing.
D=Self extinguishing.

The above results for the bis(2,3-dibromopropyl) 2-cyanoethylphosphonate are substantially equivalent to those obtained utilizing brominated triallyl phosphate.

EXAMPLE 4

The flame retardant additives of the present invention were combined with polymethyl methacrylate and tested as follows:

Polymethylmethacrylate.—Samples of fire retarded polymethyl methacrylate (PMMA) are prepared by dissolving the proper amount of the flame retardant in 100 grams of methyl methacrylate containing 0.04 grams of a polymerization catalyst (azobisisobutyronitrile). The resulting solutions were poured into tubular molds and bulk polymerization was initiated by heating the solutions to a temperature of between about 85–90° C. The polymerization was allowed to proceed for a period of about 16 hours yielding solid polymer rods having a diameter of 10 mm.

The fire retardancy of these rods was then quantitatively evaluated by determining their Limiting Oxygen Index (LOI) by means of the procedure described in Fenimore and Martin in the November, 1966 issue of Modern Plastics. In brief, this procedure directly relates flame retardancy to a measurement of the minimum percentage concentration of oxygen in an oxygen:nitrogen mixture which permits the sample to burn; the LOI being calculated as follows:

$$\text{LOI} = \left(\frac{[O_2]}{[O_2]+[N_2]}\right) \times 100$$

Thus, a higher LOI is indicative of a higher degree of flame retardancy.

The following table presents the results of this evaluation.

TABLE II

| Fire retardant | LOI[1] | |
|---|---|---|
| | 10%[2] | 20%[2] |
| $(CH_2BrCHBrCH_2O)_2P(O)CH_2CH_2CN$ | 20.85 | 22.0 |
| $(CH_2BrCHBrCH_2O)_3P(O)$ | 20.1 | 22.5 |
| Blank | 17.7 | |

[1] LOI=Limiting Oxygen Index or percent oxygen at which value the sample will burn for less than 3 minutes when ignited in a G.E. Candle Tester. Values are ±.3.
[2] Loadings are percent, by weight, based on the weight of the polymethyl methacrylate.

The compound of Example 1 provided the same flame proofing characteristics to the polymethyl methacrylate at 10% and 20% loadings as brominated triallyl phosphate. Specifically, at 10% loadings the compound of Example 1 provided an LOI of 20.85 as against 20.1 for the brominated triallyl phosphate. At 20% loadings the compound of Example 1 provided as LOI of 22.0 as against 22.5 for brominated triallyl phosphate. The control with no flame retardant gave an LOI of 17.7.

These results show that the compounds of the present invention which contain 60% bromine and 5.8% phosphorus are as effective as compounds of the prior art containing 68.7% bromine and 4.5% phosphorus. That it would be expected that the compounds of the present invention would not be as effective due to the large fire retardant advantage generally conferred by the bromine atom on a fire retardant compound. The increased fire retardancy can not be attributed to the slight increase in the amount of phosphorus present in the compounds of the present invention. The increased fire retardancy can only be attributed to the synergistic effect the nitrogen has on the phosphorus.

EXAMPLE 5

In a manner similar to the preceding Example 4, rods of rigid polystyrene were prepared by bulk polymerizing 100 grams of styrene with 5 grams of divinyl benzene in the presence of 0.5 grams of benzoyl peroxide as catalyst and the desired amount of flame retardant. These rods were tested for flame retardancy using the L.O.I. test given above with the following results:

TABLE III

| Fire retardant | LOI[1] | |
|---|---|---|
| | 10% | 20% |
| Blank | (18.95) | |
| $(CH_2BrCHBrCH_2O)_2P(O)CH_2CH_2CN$ | 21.80 | 23.40 |
| $(CH_2BrCHBrCH_2O)_3P(O)$ | 22.50 | 23.90 |

[1] LOI=Limiting Oxygen Index as defined above.

EXAMPLE 6

Films of cellulose acetate containing varying amounts of bis(2,3-dichloropropyl) 2-cyanoethylphosphonate were prepared according to the method of Example 4 using pure acetone as solvent. The Limiting Oxygen Index for these films was determined with the following results:

TABLE IV

| Fire retardant | 5% | 10% |
|---|---|---|
| Blank | 17–18 | |
| $(CH_2ClCHClCH_2O)_2P(O)CH_2CH_2CN$ | 19.28 | 20.01 |

Thus all types of both synthetic and naturally derived polymers and compounded polymers may be utilized in preparing fire retardant compositions using the fire retardant additives of the present invention.

All of the disclosed polymer systems are well known and each has extensive utilities well known to those skilled in the art. Some of the polymers are useful as fiber formed whereas others are used for molding compositions or are extruded to form various objects. The compositions of the invention can also be used equally as well for these well known utilities. The flame retardant additives can be used alone or in combination with other flame retardants. The flame retardants are incorporated in or on the polymer as may be appropriate for the form of polymer used. The additives can be incorporated in blends which are used for extrusion, milling injection molding and the like. The additives can be added to polymer solution which are used to cast films. Also, the additives can be added to spinning solutions such as in viscose rayon. The additives can also be coated onto preformed polymer shapes such as fiber batts, films, etc. This can be accomplished by padding, dipping, spraying (in an appropriate liquid medium) and the like. The fire retardant additives can be added to protective coatings generally applied to the exterior of a structure such as a polymer based paint. These are given only as illustrative of the numerous utilities for the compositions of the invention.

The invention is defined in the claims which follow.

What is claimed is:

1. A flame retardant composition comprising in admixture, a polymeric material selected from the group consisting of polyurethanes, cellulosics, modified cellulosics, polyamides, polyhalides, polyolefins, polyesters, acrylics, polyethers, polyacetals, epoxy, phenolics, polypropyleneoxide, rubber, nitrocellulose, and, as a flame retardant therefor, from about 2.5 to about 25%, by weight, of a bis(2,3 - dihalopropyl)cyanoethylphosphonate of the formula:

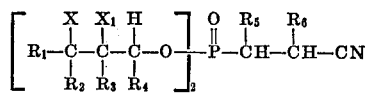

wherein $R_1$ and $R_2$ independently represent hydrogen, $C_1$–$C_4$ alkyl and $C_1$–$C_4$ haloalkyl radicals; $R_3$, $R_4$, $R_5$, and $R_6$ independently represent hydrogen and $C_1$–$C_4$ alkyl radicals; and X and $X_1$ are halogen radicals derived from chlorine or bromine.

2. A composition as recited in claim 1 wherein said polymeric material is rayon.

3. A composition as recited in claim 1 wherein said polymeric material is cellulose acetate.

4. A composition as recited in claim 1 wherein said polymeric material is an acrylic polymer.

5. A composition as recited in claim 1 wherein the fire retardant compound is bis(2,3-dibromopropyl) 2-cyanoethylphosphonate.

6. A method of flame retarding a polymer composition selected from the group consisting of polyurethanes, cellulosics, modified cellulosics, polyamides, polyhalides, polyolefins, polyesters, acrylics, polyethers, polyacetals, epoxy, phenolics, polyphenyleneoxide, rubber, nitrocellulose which comprises incorporating in said polymer an effective flame retardant amount of a bis(2,3-dihalopropyl) cyanoethylphosphonate of the formula:

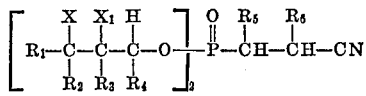

wherein $R_1$ and $R_2$ independently represent hydrogen, $C_1$–$C_4$ alkyl and $C_1$–$C_4$ haloalkyl radicals; $R_3$, $R_4$, $R_5$, and $R_6$ independently represent hydrogen and $C_1$–$C_4$ alkyl radicals; and X and $X_1$ are halogen radicals derived from chlorine or bromine.

References Cited
UNITED STATES PATENTS

| | | | |
|---|---|---|---|
| 3,157,613 | 11/1964 | Anderson et al. | 106—16 |
| 3,284,216 | 11/1966 | Kaplan | 106—16 |
| 3,344,112 | 9/1967 | Birum et al. | 106—16 |

HARRY WONG, Jr., Primary Examiner

U.S. Cl. X.R.

260—45.9 R